June 21, 1938.  E. C. HORTON  2,121,233
WINDSHIELD CLEANER
Filed Feb. 19, 1934  2 Sheets-Sheet 1
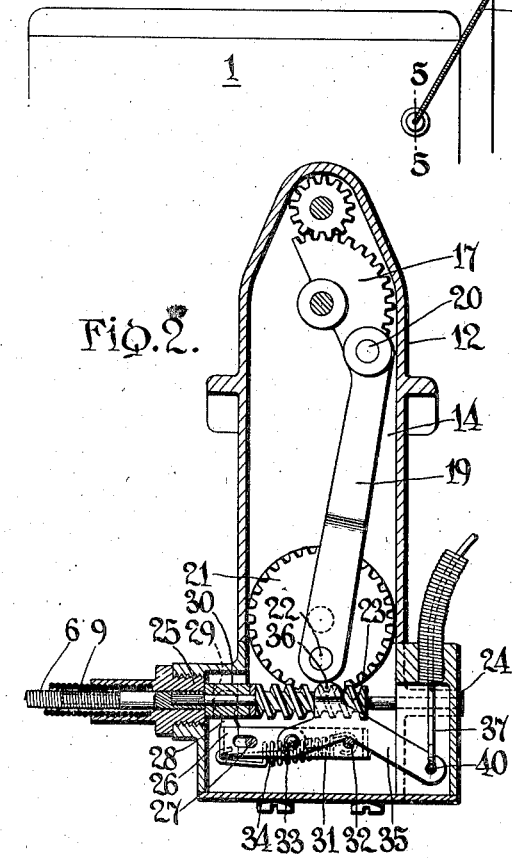
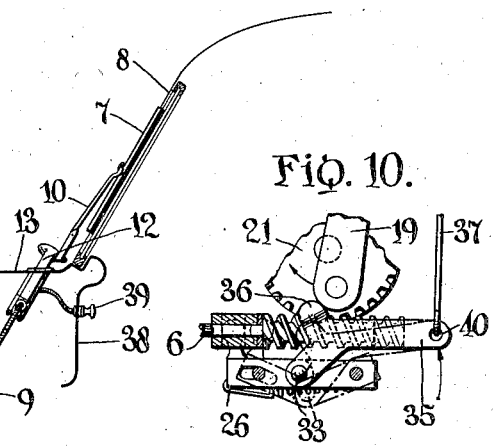
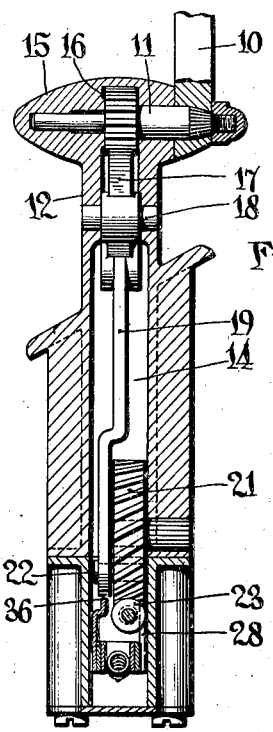
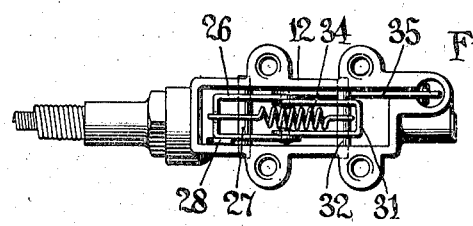
INVENTOR
Erwin C. Horton,
BY
Beau & Brooks
ATTORNEY

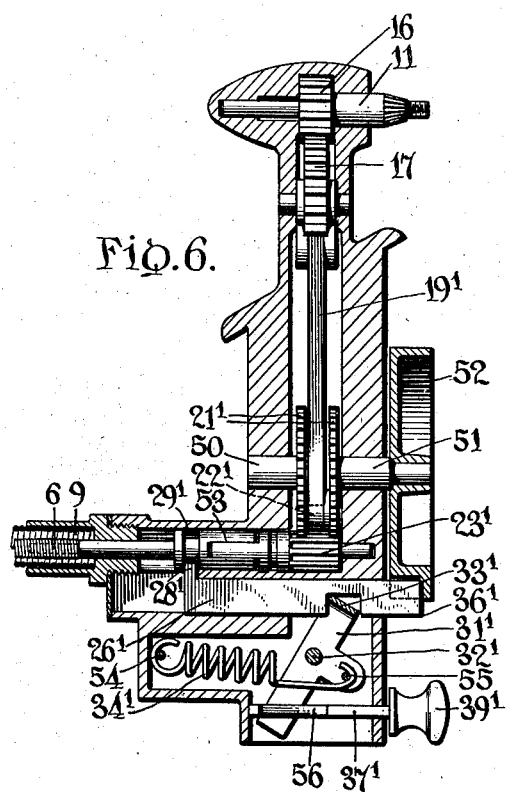
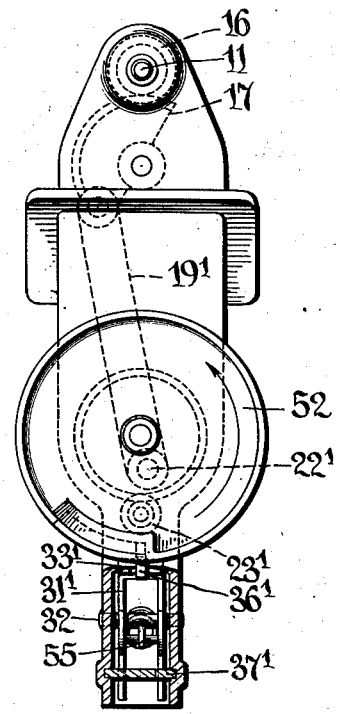
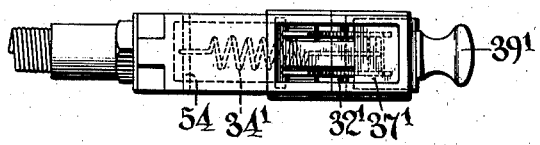
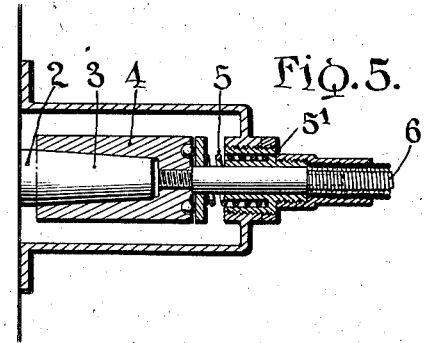

Patented June 21, 1938

2,121,233

UNITED STATES PATENT OFFICE 2,121,233

WINDSHIELD CLEANER

Erwin C. Horton, Hamburg, N. Y., assignor to Trico Products Corporation, Buffalo, N. Y.

Application February 19, 1934, Serial No. 712,043

6 Claims. (Cl. 192—33)

This invention relates to a windshield cleaner construction for motor vehicles and has for its primary aim to provide a more efficient and durable cleaner for the present day automobile.

Windshield cleaners of the present day motor vehicle are operated primarily through the low pressure derived from the intake manifold of the internal combustion engine, and being light in weight their motors are admirably adapted for mounting in the header constructions of the vehicles. In this type of cleaner the wiper is parked by confining the suction to one side only of the cleaner motor against a reverse application.

In certain types of vehicles it is preferable to dispose the wiper at the bottom of the windshield and because of this disposition the cleaner may be conveniently driven in a positive manner from a moving part of the engine or vehicle. In parking the wiper when it is so driven, a different problem arises, in that the disconnection of the wiper from its drive must be timed or definitely related with respect to the cycle of movement of the wiper in order to bring the latter to rest to one side of the field of vision.

It is an object of the present invention to provide an efficient, mechanical cleaner operating mechanism having parking means associated therewith by which the wiper may be brought to rest at one side of the field of vision in a simple practical manner. The invention further has for its object to provide an improved mechanical drive for the wiper, particularly adapted for a cowl mounting on the vehicle, for imparting a back and forth motion to the wiper.

In the drawings:

Fig. 1 depicts in fragment a motor vehicle equipped with one embodiment of the improved windshield cleaner;

Fig. 2 is a vertical cross sectional view of the cleaner mechanism taken transversely of the vehicle;

Fig. 3 is a similar view taken lengthwise of the vehicle;

Fig. 4 is a bottom plan view of the construction illustrated in Fig. 2, with portions removed to more clearly depict the parking mechanism;

Fig. 5 is a section about on line 5—5 of Fig. 1 through the power take-off clutch at the engine;

Fig. 6 is a view similar to Fig. 3 of a modified embodiment;

Fig. 7 is a view in elevation of the modified embodiment;

Fig. 8 is a bottom plan view of the construction illustrated in Figs. 6 and 7;

Fig. 9 is a detail elevation of a part of the parking mechanism; and

Fig. 10 is a fragmentary view further showing the parking operation of the embodiment of Figs. 1-4.

Referring more particularly to the drawings, the numeral 1 designates the motor vehicle engine having a power take-off shaft 2 with a cone face 3 forming a part of a cone clutch, the female part 4 thereof being urged into clutching relation with the cone 3 by resilient means 5. Adjustment of the spring 5 may be effected by threading the sleeve 5' in or out. The cone socket 4 is illustrated as being connected to a flexible shaft 6 forming part of a transmission up to the wiper blade 7 on the windshield or window 8. The flexible shaft 6 is axially slidable in its protective armor 9 so as to permit separation of the clutch parts 3 and 4 for disconnecting the drive from the wiper.

The wiper blade 7 is carried by an oscillatory arm 10 which is fixed to a shaft 11 journalled in the upper end of a hollow standard or housing 12 substantially at a normal to the plane of the windshield glass. The housing 12 extends downwardly through an opening in the cowl 13 of the vehicle body and being hollow provides a gear or transmission chamber 14 for inclosing the transmission mechanism.

Fixed on the wiper actuating shaft 11 in the head 15 of the housing 12 is a pinion 16 which meshes with an arcuate rack or segmental gear 17 journalled on the cross shaft 18 for oscillatory movement under the push and pull motion of link 19, to which latter it is pivotally connected as at 20. The lower end of this link 19 is connected to a gear 21 by crank pin 22 so that as the gear is rotated the link 19 will reciprocate to rock or oscillate the segmental gear 17 and impart like movement to the wiper carrying arm 10. The gear 21 is driven from the flexible shaft 6 through the connected worm 23, such worm being given slidable support at opposite ends by the bearings 24 and 25 provided in the opposing wall portions of the transmission chamber 14. Such slidable mounting for the worm provides for the longitudinal shifting of the flexible shaft 6 sufficiently to disengage the clutch part 4 from the cone 3.

Means are provided for shifting the flexible shaft. According to the present disclosure such shifting means comprises a spring snap action which serves to hold the shaft in either position. This snap action consists of a movably mounted shifting member 26 which is both slidably and pivotally mounted on the cross pin 27 and has an arm 28 engaged in a groove 29 of a collar 30 (the latter rotatably receiving the worm or flexible shaft) so that as the member 26 moves on the pin 27 the arm 28 will shift the flexible shaft axially. A link 31 is pivoted on a cross pin 32 and connected to the shifting member 26 by pivot pin 33. A tension spring 34 is connected to the pivot pin 32 and also to the member 26, so that when the pivot pin is moved from a position below the line of spring force to a position above the same, or vice versa, the spring will act to hold the shifter member in the corresponding one of its two positions, either in the clutch engaging position or in the clutch disengaging position.

This toggle-like arrangement is broken by and during movement of the transmission to effect disengagement of the clutch parts 3 and 4 at a predetermined point in the travel of the wiper blade. To this end a parking element in the form of a lever 35 may be pivoted on the pin 33 and made to fulcrum on the pin 32, such parking element having a shoulder 36 adapted to be positioned in the path of the connecting link 19. For so positioning the shoulder 36 the parking element 35 is connected by a push-pull wire 37 leading to the instrument panel 38 or some other accessible position. Consequently when it is desired to park the wiper blade the motorist pulls on the knob 39 to lift on the parking element 35 and thereby preset the shoulder 36 into the path of the downcoming link 19 (Fig. 10) so that when the link engages the shoulder 36 the downward thrust will move the lever 35 (about its connecting point 40 with the push-pull wire as a fulcrum) and break the toggle arrangement downwardly, as illustrated by the dotted lines in Fig. 10. This brings the pivot 33 beneath the line of spring force whereupon the spring will rock the shifting member 26 and thereby move the flexible shaft 6 axially to disconnect the transmission from the source of power.

When it is desired to re-establish the driving relationship the motorist simply pushes in on the knob 39 so that the parking element 35 will rock on the pin 32 and bring the pivot 33 above the line of spring force, or across a dead center position, during which movement the flexible shaft will have been shifted in the opposite direction to re-engage the clutch socket with the clutch cone, the spring acting in each position to hold the flexible shaft in its newly acquired position. The toggle-like arrangement is prevented from snapping upwardly from the position shown in Fig. 2 by reason of the fixed pins 27 and 32 and the arm 28 bearing against the collar 30 which latter can move no further by reason of the bearing 25.

In the embodiment disclosed in Figs. 6, 7, 8 and 9 the wiper actuating shaft 11 is provided with the pinion 16 in meshing relation with the segmental gear or rack 17. The reciprocating link 19' in this embodiment has its lower end connected to the wrist or crank pin 22' which joins a pair of gears 21'. The link 19' therefore moves in and out between the companion gears 21' as the latter are rotated by a gear 23'. The companion gears are mounted on axially aligned stub shafts 50 and 51 one of which is extended to support a parking element or disc 52 fixed thereon.

In this embodiment the gear 23' is preferably held against axial movement, the same being connected to the flexible shaft 6 by a longitudinal play connection 53 which permits such flexible shaft to have the desired axial shift to disconnect the clutch socket 4 from the cone 3. The flexible shaft is provided with an annular groove 29' in which is engaged an arm 28' of a slidably mounted shifter member 26'. A second member 31' is pivotally mounted at 32' and has pivotal connection with the shifter 26' as by means of the lug and notch connection 33'. A spring 34' is anchored at a fixed point 54 and also to the member 31' by pin 55 in such a manner that as the member 31' is rocked on its pivot 32' the line of spring force will be moved above or below such pivot. The spring 34' therefore acts indirectly on the shifter member to hold it in either of its positions. In the position shown in Fig. 6, the transmission is disconnected from its source of power.

When it is desired to re-establish a driving relationship therebetween the motorist will pull on the knob 39' to rock said member 31' and positively move the shifter member 26' to shift the flexible shaft into clutched relationship with its drive, the spring 34' moving across and above a dead center position to secure the clutched drive. The hand knob 39' is illustrated as having an inwardly extending bar 37' formed with marginal slots 56 to freely receive the depending forked end of the member 31' in a manner to permit independent movement of the latter. By reason of this play connection the snap action will quickly effect a clutching of the flexible shaft to its drive immediately upon movement of the line of spring force across the pivot 32'. The play connection 56 permits the knob 39' being pushed in sufficiently to rock the lever 31' enough to lower the line of spring force below dead center but insufficient to declutch the drive, there being ample lost motion for this purpose. This presetting urges the shoulder 36' against the face of member 52 so that the shoulder will drop in the recess when it comes opposite.

When it is desired to unclutch the transmission from the drive the operator merely pushes in on the knob 39' until the line of spring force is moved beneath the pivot 32' whereupon the spring will quickly move the shifter member 26' to declutch the cleaner from its source of power. Such declutching operation, however, is under the control of the transmission in a permissive manner as distinguished from the positive manner in the embodiment of Figs. 2, 3 and 4. According to the present disclosure this permissive shifting of the flexible shaft is timed by and under the control of the transmission through the parking element or disc 52 which latter is provided with a recess 57 in a face portion thereof. This recess is adapted to be brought opposite the shifter 26' as the parking member revolves whereby the shouldered extension 36' of the shifter may drop into the recess under the urge of the spring 34' and thus effect disconnection of the flexible shaft from its driving cone 3.

Thus, the declutching of the transmission from its drive is effected, positively in one case and permissively in the other, by and during movement of the transmission and in such timed relationship therewith as to park the wiper to one side of the field of vision. Therefore, the expression in the appended claims referring to the parking of the cleaner by movement of the transmission is used in an inclusive and generic sense to comprehend both embodiments of the invention and variations thereof, since the disclosure made by the drawings is made for the purpose of illustrating the preferred expressions of the inventive concept.

What is claimed is:

1. Mechanism of the character described comprising a shaft, a drive member, transmission means operatively connecting the shaft to the drive member and embodying parts which are separable to interrupt the transmission of power for the arrest of the shaft, a spring actuated snap action operatively connected to one of said parts for separating it from the companion part, means for manually loading the spring of the snap action and disposing the latter in an inoperative position whereby upon release from such position the snap action will effect a quick separation of said parts, and means operable by said transmission means for timely effecting such release of said inoperatively disposed snap action.

2. Mechanism of the character described comprising a shaft, a drive member, transmission means operatively connecting the shaft to the drive member and embodying parts which are separable to interrupt the transmission of power for the arrest of the shaft, a spring snap action operatively connected to one of said parts and movable back and forth between two positions with the spring of said snap action serving to hold the latter in both of its two positions, said snap action holding the parts together in one position and holding them separated in its other position, means for manually disposing the snap action in one position, and means operable by said transmission means for effecting timely movement of the snap action to its other position to arrest the shaft.

3. Mechanism of the character described comprising a housing having a chamber, a shaft journalled in the chamber, a drive member, transmission means extending through the chamber and operatively connecting the drive member to the shaft, said transmission means embodying parts separable to interrupt the transmission of power for the arrest of the shaft, said transmission means having an element mounted in the housing chamber and movable to effect separation of said parts, and means carried by the housing and including a part of said transmission means for timely moving said element to effect arrest of the shaft in a predetermined position.

4. Mechanism of the character described comprising a housing having a chamber, a shaft journalled in the chamber, a drive member, transmission means extending through the chamber and operatively connecting the drive member to the shaft, said transmission means embodying parts separable to interrupt the transmission of power for the arrest of the shaft, said transmission means having an element mounted in the housing chamber and movable to effect separation of said parts, a spring snap action carried by the housing and operatively connected to said element for moving the latter from one to the other of two positions, means for manually setting the snap action in one position, and means operable by said transmission means for causing the snap action to move the element to another position for arresting the shaft.

5. Mechanism of the character described comprising a shaft, a drive, a transmission connecting the drive to the shaft and including cooperating connector parts, means for rendering the connector parts relatively inoperative, said means including a movably mounted member, a spring movable back and forth by said member across a position of maximum spring distortion whereby said spring may act on said member to urge it in either direction away from such position, means operatively connecting said movably mounted member to one of said connector parts to relate it inoperatively to its companion connector part, said movable member being operable by a moving part of the transmission to shift the spring from a set position across such first position, and means for presetting said movable member for engagement by said moving part.

6. Mechanism of the character described comprising a shaft, a rotative drive part, a driven part cooperative with said drive part and connected to said shaft, one of said parts being shiftable to an inoperative relationship with respect to the companion part, resilient means releasable by a shaft connected trip member to so shift said shiftable part for arresting the shaft, means for manually setting said resilient means for such release, and means for operatively relating said parts.

ERWIN C. HORTON.